Feb. 28, 1939.                J. C. MILLER                2,148,768
                            REGISTER TOTALIZER
                           Filed Jan. 3, 1938
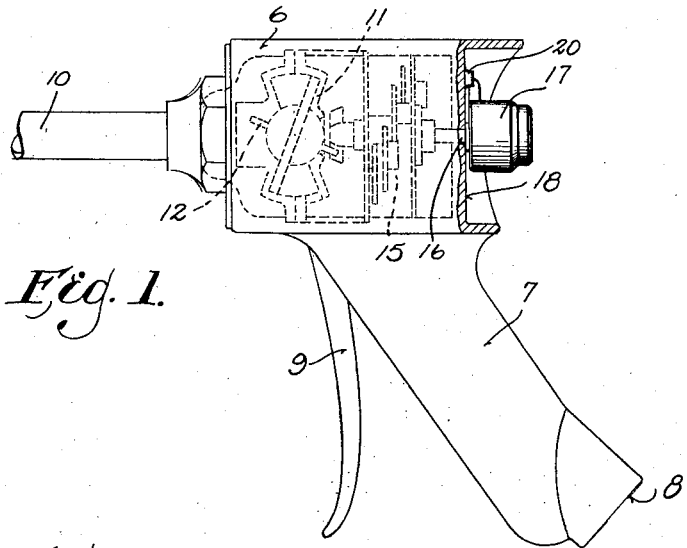
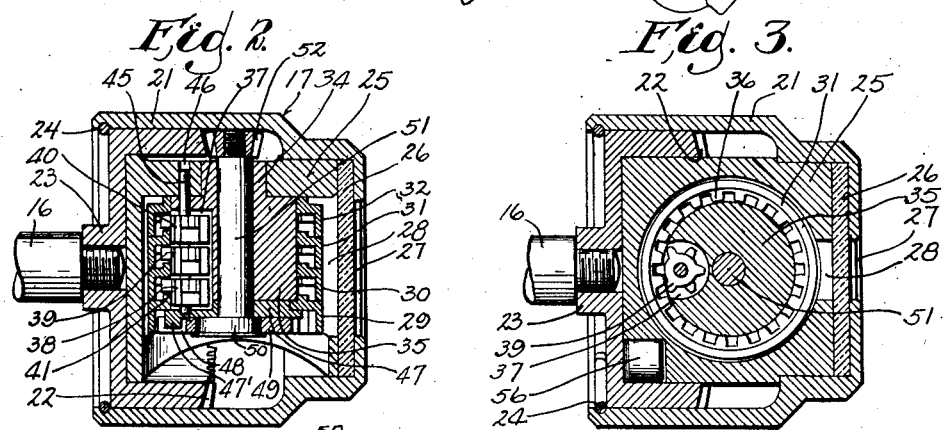
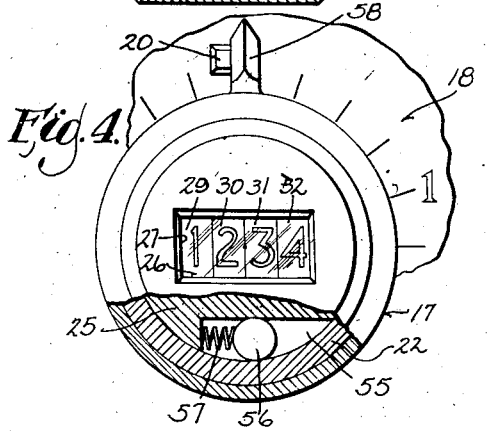
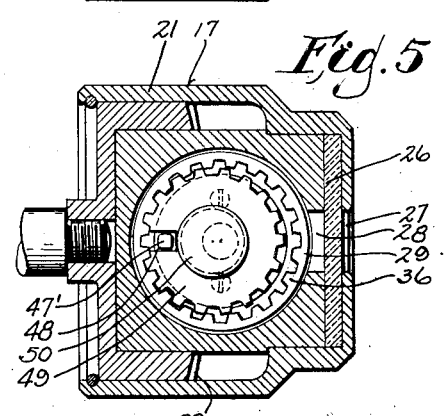
INVENTOR
JACOB C. MILLER
BY
Wheeler, Wheeler + Wheeler
ATTORNEYS Patented Feb. 28, 1939

2,148,768

UNITED STATES PATENT OFFICE 2,148,768

REGISTER TOTALIZER

Jacob C. Miller, Milwaukee, Wis., assignor to Badger Meter Manufacturing Company, Milwaukee, Wis., a corporation of Wisconsin Application January 3, 1938, Serial No. 182,999

9 Claims. (Cl. 235—91)

This invention relates to improvements in register totalizers.

The invention has particular reference to meter register dials. It is the primary object of the invention to provide a register knob with means for resetting it upon the meter or register shaft, and means whereby the resetting operation will totalize automatically the flow through the meter. In other words, it is my purpose that the knob move bodily with the shaft carrying a pointer coacting with a suitably calibrated scale to show the number of units of register advance in a given operation, it being intended that the knob and pointer be restored to a datum or beginning point preceding each operation. The restoration of the knob to such datum or beginning point involves relative movement between the knob and shaft and it is my object to use such relative movement to operate a register gear set preferably housed within the knob itself to add on to the dials of such a register the total number of units of advance which had occurred since the knob was last reset.

Other objects and advantages of the invention will appear from the following disclosure.

In the drawing:

Figure 1 is a view of my improved totalizer knob in side elevation as it appears when applied to a form of metering and dispensing nozzle which is illustrated partially in side elevation and partially broken away to a section such as to expose the knob.

Figure 2 is a view in axial section through the knob showing the knob on a greatly enlarged scale.

Figure 3 is a view in axial section through the knob in a plane at right angles to that in which Fig. 2 is taken.

Figure 4 is a view of the knob in end elevation partially broken away to a transverse section exposing a clutch incorporated therein, a fragment of a calibrated dial being shown at the background.

Figure 5 is a view similar to Fig. 3 but differing therefrom in that the register mechanism contained in the knob is shown in end elevation.

Like parts are identified by the same reference characters throughout the several views.

It will be understood that the device herein disclosed constitutes a convenient means of adding a register to any shaft. In many meters it is common to provide a shaft which is merely an indicator and is not provided with any means of registering totals. By simply applying the present device to such a shaft, as a substitute for the knob originally provided thereon, the registering mechanism built into the new knob will register the totals.

Therefore, as a convenient means of illustrating a particularly desirable application of the present device to actual commercial practice, I have shown in Fig. 1 a fragment of a grease dispensing nozzle and meter of the type disclosed in my companion application Serial No. 50,143 entitled "Lubricant metering and dispensing", filed November 16, 1935, there being a barrel at 6, a handle 7 having a supply hose connection at 8, and a valve lever at 9, the grease being discharged through the pipe 10 after passing through the motor 11. The shaft 12 of the motor 11 actuates a gear train designated in its entirety by reference character 15 which, in turn, drives the indicator shaft 16 to rotate some kind of a knob at 17 across the dial 18 from a datum point defined by the stop 20. The dial 18 is preferably provided with graduations as shown in Fig. 4 to show the number of units of advance of the indicator shaft 16.

It is common practice to drive such a knob frictionally from its shaft with a clutch which prevents the operator from advancing the knob to overrun the shaft but which permits the operator readily to turn the knob reversely to the datum point or stop for resetting. Necessarily this involves relative movement between the knob and the indicator shaft. In accordance with the present invention an element is fixed to the shaft and relative movement between this element and the knob proper is used to operate the totalizing register.

The knob 17 has a skirt portion 21 fitting the cylindrical external bearing surface of a crown gear 22, the hub 23 of which is screw threaded or otherwise fastened to the end of the indicator shaft 16. A retaining ring 24 comprising a split spring ring expanded into a groove under-cut in the skirt portion 21 of the knob, maintains the knob assembled upon the cup-shaped crown gear 22.

Fixed within the knob for rotation therewith is the cage 25 having a bearing upon the interior of the cup-shaped crown gear 22. Between cage 25 and the top of the knob is confined a piece of glass 26 constituting a window between the window opening 27 of the knob and a slot 28 cut in the cage through which the cylindrical register dials 29, 30, 31 and 32 are clearly legible. The dials and the motion transmitting connections which drive one from another constitute a conventional register set but will be briefly described.

Mounted in a suitable opening in the side of cage 25 is the reduced terminal portion 34 of an inner support 35 upon which the several dials 32 are sleeved for rotation. The dials are cup-shaped and internally toothed, as best appears at 36 in Fig. 3.

In a recess 37 at the back of the inner support 35 I provide a series of duplex pinions 38, 39 and 40 for transmitting motion from one of the register dials to another. In the illustrated construction each pinion has six teeth in one plane, three of them being extended laterally to produce an adjacent three toothed gear. The six teeth register with the internal teeth formed at 36 upon the dial. The three teeth are acted on successively by the lugs 41 of the next preceding dial in series, the arrangement being such that the complete rotation of one of the dials will cause its lug 41 to engage one of the three teeth of the adjacent pinion 39 to actuate such pinion one step in advance, thereby rotating the dial to expose the next higher digit through the window. The arrangement, being conventional and well known, will not be further described.

The several pinions are mounted upon a pin 45 which has several functions in addition to the mere support of the pinions. Pin 45 projects from the central support 35, as best shown in Fig. 2, into a hole bored at 46 in the cage 25. This provides a convenient means of fixing the inner support against rotation relative to the cage 25.

At its other end the pin 45 is journaled in a plate 47 provided with a lug 47' which is preferably squared as shown in Fig. 5 to engage in the peripheral notch 48 of the driving gear 49 to key such gear against rotation while permitting orbital movement of the gear on the eccentric 50 which is carried by the driving shaft 51. This shaft is journaled in the inner support 35 and extends transversely through the cage. At its outer end it carries a pinion 52 meshing with the teeth of the crown gear 22 so that when the knob is rotated with respect to the crown gear and the shaft 16 on which the crown gear is fixed, the resulting relative movement between the knob and the crown gear will rotate pinion 52 and drive shaft 51 and eccentric 50 to move the driving gear 49 orbitally, but non-rotatably. The pin 45 engaged in notch 48 permits of the orbital movement aforesaid but secures the driving gear against rotation.

In the course of such orbital movement the driving gear meshes with the teeth 36 of the first annular dial 29. The driving gear 49 has only eighteen teeth (in this specific example), whereas the ring gear formed in the interior of dial 29 has twenty teeth. Consequently in each orbital or cyclic movement of the driving gear 49 it will necessarily advance the dial 29 by two teeth, or one tenth of its periphery, this being the distance necessary to expose the next successive digit on the periphery of the dial. Incidentally this is the same extent of advance occasioned when one of the pinions 38, 39, 40 is rotated by a preceding dial to advance a successive dial in the series.

Obviously the mechanism thus far described would permit the total digits exposed on the register dials through the window of the knob to be varied either upwardly or downwardly according to relative direction of rotation of the knob upon the indicator shaft 16. It being desirable only to register a total corresponding to the increments of advance of the shaft and not to permit the attendant to subtract from that total, I provide a one way clutch between the knob and the crown gear 22 carried by the shaft. The cage 25 may conveniently be recessed at 55 to receive a ball or roller 56 lightly pushed by compression spring 57 toward a position in which the ball or roller clutch will wedge between the cage and the crown gear.

As viewed in Fig. 4 the direction of advance of the knob upon indicator shaft 16 is clockwise with reference to the calibrations fragmentarily illustrated. Any attempt to make the knob overrun the shaft in this direction of advance will wedge the clutch member 56 between the cage 25 and the crown gear 22 to prevent such overrun. For resetting purposes, however, the knob may readily be rotated in a counter-clockwise direction until its pointer 58 re-engages the stop 20 which is fixed on surface 18 to constitute a datum point.

If the operator holds the knob stationary during the operation of shaft 16 the same relative movement between the knob and shaft will occur as is effected by the resetting of the knob to stop 20. Consequently each increment of rotation of shaft 16 will advance the rotary dials of the register to expose the next highest digit on the total shown thereby. Likewise if the operator permits the knob to make one complete rotation so that pointer 58 engages the other side of stop 20, the knob will be brought to rest and the continued rotation of the shaft will operate the register gears to show the correct total corresponding to that knob position. The absolute total, however, will be shown only when the knob is reset to the zero or datum point.

It will be appreciated by those skilled in the art that the device herein disclosed constitutes a unitary and self-contained means of adding a totalling register to any shaft provided only that the knob be provided with some fixed stop or datum indicator to which it can be reset. When the knob is reset to the stop or datum indicator the register dials must inevitably show the total number of increments of advance of the driving shaft. In the case of the grease meter illustrated, the calibrations may indicate pounds or pints or any other appropriate unit of measure. The gear set comprising the register is not only a conventional unit but may be purchased assembled substantially as shown and it may contain any desired number of dials appropriate for its work.

I claim:

1. A device of the character described, comprising the combination with a mounting receivable upon a shaft, of a knob rotatable upon said mounting, and a register supported by said mounting and provided with driving means connected differentially between said knob and mounting to be actuated by relative movement therebetween.

2. A device of the character described, comprising the combination with a mounting adapted to be disposed upon a shaft, of a knob rotatably carried by said mounting, means fixing a datum point with respect to which said knob is rotatably adjustable upon said mounting, a totalizing register supported from said mounting, and means for driving said register comprising a gear connected with said mounting and a pinion connected with said register in mesh with said gear and mounted to rotate bodily with said knob, whereby said register will be actuated by the resetting of said knob to said datum point.

3. A device of the character described, comprising the combination with a mounting provided with means for connecting it with a shaft, of an indicating head rotatably journaled on said mounting, a register disposed within said head, and means for driving said register differentially connected between said mounting and said head for the actuation of said register upon relative movement of said head with respect to said mounting.

4. A device of the character described, comprising the combination with an indicator head and a driving device therefor, of a one way clutch means disposed to lock said head to said driving device against overrun in advance of said head respecting said device while permitting reverse adjustment of said head respecting said device, and a totalizing register including driving means differentially connected between said head and said device for the advance of said register in accordance with the increments of reverse movement of said head respecting said device.

5. In a device of the character described, the combination with a rotatable indicator head and a means for frictionally driving said head, of a register comprising successive dials and motion transmitting connections therebetween, and driving mechanism for said register comprising gear and pinion teeth differentially connected respectively with said driving means and said head and in planetary mesh, whereby to actuate said dials in accordance with relative movement between said head and said driving means, said driving means constituting a support on which said head and register are mounted.

6. In a device of the character described, the combination with a knob provided with a window, of a register having dial means exposed within the window and mounted within said knob to turn therewith, a transverse register driving shaft provided with a pinion, and a mounting means comprising a ring gear with which said pinion meshes for planetary movement to actuate said register in accordance with relative movement between said knob and the mounting means.

7. A device of the character described comprising the combination with a crown gear provided with a shaft mounting, of a knob having a portion journaled externally with reference to the crown gear, means carried by the knob fitted internally to the crown gear for bearing thereon, means securing said knob and crown gear together in unitary assembly, and a register mounted within said knob and provided with a driving pinion meshing with said crown gear for planetary movement thereon in accordance with relative motion between said knob and crown gear.

8. A device of the character described comprising a driving member having a shaft mounting, a knob having means fixing its position upon said driving member for rotation thereon, said knob being windowed, a register housed within the knob having dials exposed through the window thereof, driving means for said register housed within said knob and engaged with said member to provide a differential connection for the actuation of said register in accordance with relative rotative movement between the knob and member, and means for restraining said knob against movement relative to said member in one direction.

9. A device of the character described, comprising a knob provided with a transverse window in its end and having a skirt portion with an interior bearing surface, a supporting member upon which said surface is journaled, means unitarily securing said member in assembly with reference to said knob, a cage within said knob, a register mechanism mounted within said cage and comprising totalizing dials visible through the window in the end of the knob, and driving connections operatively provided with driving means differentially connected between said knob and member for the actuation of said register mechanism in accordance with relative movement between said member and knob, said knob being provided with a one way clutch connection to said member for permitting adjustment of said knob respecting said member in one direction only.

JACOB C. MILLER.